United States Patent
Hasegawa

(10) Patent No.: US 9,576,226 B2
(45) Date of Patent: Feb. 21, 2017

(54) IMAGE PROCESSING DEVICE FOR REDUCING DATA SIZE OF OBJECT IN IMAGE DATA BASED ON TARGET VALUE

(71) Applicant: BROTHER KOGYO KABUSHIKI KAISHA, Nagoya-shi, Aichi-ken (JP)

(72) Inventor: Tomohiko Hasegawa, Okazaki (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/628,399

(22) Filed: Feb. 23, 2015

(65) Prior Publication Data

US 2015/0249827 A1 Sep. 3, 2015

(30) Foreign Application Priority Data

Feb. 28, 2014 (JP) ................. 2014-038266

(51) Int. Cl.

| | | |
|---|---|---|
| *G06K 15/00* | (2006.01) | |
| *G06K 15/02* | (2006.01) | |
| *H04N 19/15* | (2014.01) | |
| *H04N 19/124* | (2014.01) | |
| *H04N 19/14* | (2014.01) | |

(Continued)

(52) U.S. Cl.
CPC ............ *G06K 15/02* (2013.01); *H04N 1/642* (2013.01); *H04N 19/124* (2014.11); *H04N 19/14* (2014.11); *H04N 19/15* (2014.11); *H04N 19/162* (2014.11); *H04N 19/17* (2014.11);

(Continued)

(58) Field of Classification Search
CPC ......... G06T 15/02; G06T 3/40; G06T 3/4092; G06T 3/409; H04N 19/172; H04N 19/124; H04N 1/3935; H04N 19/17; H04N 1/393; H04N 21/2662; H04N 19/15; H04N 19/14; H04N 19/192; H04N 19/625; H04N 1/41; G06K 15/02

See application file for complete search history.

(56) References Cited

U.S. PATENT DOCUMENTS

| | | | |
|---|---|---|---|
| 2005/0123048 A1* | 6/2005 | Kondo | ................. H04N 19/172 375/240.16 |
| 2009/0245629 A1* | 10/2009 | Hayami | ................. H04N 1/648 382/166 |

(Continued)

FOREIGN PATENT DOCUMENTS

| | | |
|---|---|---|
| JP | 2004-362541 A | 12/2004 |
| JP | 2010-103997 A | 5/2010 |

*Primary Examiner* — Jingge Wu
(74) *Attorney, Agent, or Firm* — Merchant & Gould P.C.

(57) ABSTRACT

An image processing device includes a controller. The controller is configured to perform: acquiring image data having a plurality of objects; calculating an amount of characteristic of each of the objects, the amount of characteristic indicating a degree of change in pixel values; setting a process order based on the amount of the characteristic of each of the objects; setting a target value, the target value being a reference value to reduce a data size of the image data; reducing an object data size of at least one of the plurality of objects based on the process order in such a way that the data size of the image data becomes smaller than or equal to the target value, thereby generating a reduced object; and generating reduced image data having a data size smaller than the data size of the image data by using the reduced object.

7 Claims, 9 Drawing Sheets

(51) Int. Cl.
  *H04N 19/162*    (2014.01)
  *H04N 19/17*     (2014.01)
  *H04N 19/192*    (2014.01)
  *H04N 19/625*    (2014.01)
  *H04N 1/64*      (2006.01)
  *H04N 19/59*     (2014.01)

(52) U.S. Cl.
  CPC ......... *H04N 19/192* (2014.11); *H04N 19/625* (2014.11); *H04N 19/59* (2014.11)

(56) References Cited

U.S. PATENT DOCUMENTS

| | | | |
|---|---|---|---|
| 2010/0027067 A1* | 2/2010 | Tsunekawa | G06F 3/1237 358/1.15 |
| 2011/0119716 A1* | 5/2011 | Coleman, Sr. | H04N 7/181 725/62 |
| 2011/0150341 A1* | 6/2011 | Yamamoto | G06K 9/4604 382/190 |
| 2011/0243470 A1* | 10/2011 | Noguchi | H04N 19/176 382/239 |
| 2013/0088570 A1* | 4/2013 | Takahashi | H04N 13/0048 348/43 |
| 2013/0223728 A1* | 8/2013 | Yamada | G06K 9/4652 382/163 |
| 2014/0037209 A1* | 2/2014 | Robinson | G06K 9/6232 382/170 |
| 2015/0089348 A1* | 3/2015 | Jose | G06F 17/30905 715/234 |
| 2015/0154792 A1* | 6/2015 | Shi | G06T 3/0012 345/427 |

* cited by examiner

FIG. 4A
COMPRESSION TABLE CORRESPONDING TO LUMINANCE (HIGEST QUALITY)

| 2 | 1 | 1 | 2 | 3 | 5 | 6 | 7 |
|---|---|---|---|---|---|---|---|
| 1 | 1 | 2 | 2 | 3 | 7 | 7 | 7 |
| 2 | 2 | 2 | 3 | 5 | 7 | 8 | 7 |
| 2 | 2 | 3 | 3 | 6 | 10 | 10 | 7 |
| 2 | 3 | 4 | 7 | 8 | 13 | 12 | 9 |
| 3 | 4 | 7 | 8 | 10 | 12 | 14 | 11 |
| 6 | 8 | 9 | 10 | 12 | 15 | 14 | 12 |
| 9 | 11 | 11 | 12 | 13 | 12 | 12 | 12 |

FIG. 4B
COMPRESSION TABLE CORRESPONDING TO LUMINANCE (HIGEST COMPRESSTION RATE)

| 24 | 16 | 15 | 24 | 35 | 59 | 75 | 90 |
|---|---|---|---|---|---|---|---|
| 18 | 18 | 21 | 28 | 38 | 85 | 88 | 81 |
| 21 | 19 | 24 | 35 | 59 | 84 | 101 | 82 |
| 21 | 25 | 32 | 43 | 75 | 128 | 118 | 91 |
| 26 | 32 | 54 | 82 | 100 | 160 | 151 | 113 |
| 35 | 51 | 81 | 94 | 119 | 153 | 166 | 135 |
| 72 | 94 | 115 | 128 | 151 | 178 | 176 | 148 |
| 106 | 135 | 140 | 144 | 165 | 147 | 151 | 146 |

FIG. 4C
COMPRESSION TABLE CORRESPONDING TO COLOR DIFFERENCE (HIGEST QUALITY)

| 2 | 2 | 3 | 6 | 12 | 12 | 12 | 12 |
|---|---|---|---|---|---|---|---|
| 2 | 2 | 3 | 8 | 12 | 12 | 12 | 12 |
| 3 | 3 | 7 | 12 | 12 | 12 | 12 | 12 |
| 6 | 8 | 12 | 12 | 12 | 12 | 12 | 12 |
| 12 | 12 | 12 | 12 | 12 | 12 | 12 | 12 |
| 12 | 12 | 12 | 12 | 12 | 12 | 12 | 12 |
| 12 | 12 | 12 | 12 | 12 | 12 | 12 | 12 |
| 12 | 12 | 12 | 12 | 12 | 12 | 12 | 12 |

FIG. 4D
COMPRESSION TABLE CORRESPONDING TO COLOR DIFFERENCE (HIGEST COMPRESSTION RATE)

| 25 | 26 | 35 | 69 | 146 | 146 | 146 | 146 |
|---|---|---|---|---|---|---|---|
| 26 | 31 | 38 | 97 | 146 | 146 | 146 | 146 |
| 35 | 38 | 82 | 146 | 146 | 146 | 146 | 146 |
| 69 | 97 | 146 | 146 | 146 | 146 | 146 | 146 |
| 146 | 146 | 146 | 146 | 146 | 146 | 146 | 146 |
| 146 | 146 | 146 | 146 | 146 | 146 | 146 | 146 |
| 146 | 146 | 146 | 146 | 146 | 146 | 146 | 146 |
| 146 | 146 | 146 | 146 | 146 | 146 | 146 | 146 |

IMAGE PROCESSING DEVICE FOR REDUCING DATA SIZE OF OBJECT IN IMAGE DATA BASED ON TARGET VALUE

CROSS REFERENCE TO RELATED APPLICATION

This application claims priority from Japanese Patent Application No. 2014-038266 filed Feb. 28, 2014. The entire content of the priority application is incorporated herein by reference.

TECHNICAL FIELD

The present invention relates to an image processing apparatus.

BACKGROUND

Japanese Patent Application Publication No. 2010-103997 discloses an image compression device. When an image is expressed based on PDL data used for generating print data, the image compression device compresses an object included in PDL data based on an attribute of the object.

SUMMARY

According to the method described above, compression can be performed according to the object. However, there is a problem that the object may be excessively compressed, resulting in significant degradation of the image.

In view of the foregoing it is an object of the present invention to provide an image processing device that can produce image data having reduced size while suppressing degradation of the image.

In order to attain the above and other objects, the invention provides an image processing device including a controller. The controller may be configured to perform: acquiring image data representing an image and having a plurality of objects, each of the plurality of objects defining an object region in the image, each of the plurality of objects having pixels; calculating an amount of characteristic of each of the plurality of objects, the amount of characteristic indicating a degree of change in pixel values corresponding to the pixels in the object; setting a process order based on the amount of the characteristic of each of the plurality of the objects; setting a target value with respect to the image data, the target value being a reference value to reduce a data size of the image data; reducing an object data size of at least one of the plurality of objects based on the process order in such a way that the data size of the image data becomes smaller than or equal to the target value, thereby generating a reduced object; and generating reduced image data having a data size smaller than the data size of the image data by using the reduced object.

According to another aspect, the present invention provides a non-transitory computer readable storage medium storing a set of program instructions installed on and executed by a computer. The program instructions may include: acquiring image data representing an image and having a plurality of objects, each of the plurality of objects defining an object region in the image, each of the plurality of objects having pixels; calculating an amount of characteristic of each of the object, the amount of characteristic indicating a degree of change in pixel values corresponding to the pixels in the object; setting a process order based on the amount of the characteristic of each of the plurality of the objects; setting a target value with respect to the image data, the target value being a reference value to reduce a data size of the image data; reducing an object data size of at least one of the plurality of objects based on the process order in such a way that the data size of the image data becomes smaller than or equal to the target value, thereby generating a reduced object; and generating reduced image data having a data size smaller than the data size of the image data by using the reduced object.

BRIEF DESCRIPTION OF THE DRAWINGS

The particular features and advantages of the invention as well as other objects will become apparent from the following description taken in connection with the accompanying drawings, in which:

FIGS. 4A-4D are explanatory diagrams of compression tables;

DETAILED DESCRIPTION

First Embodiment

Configuration

Figure 1:
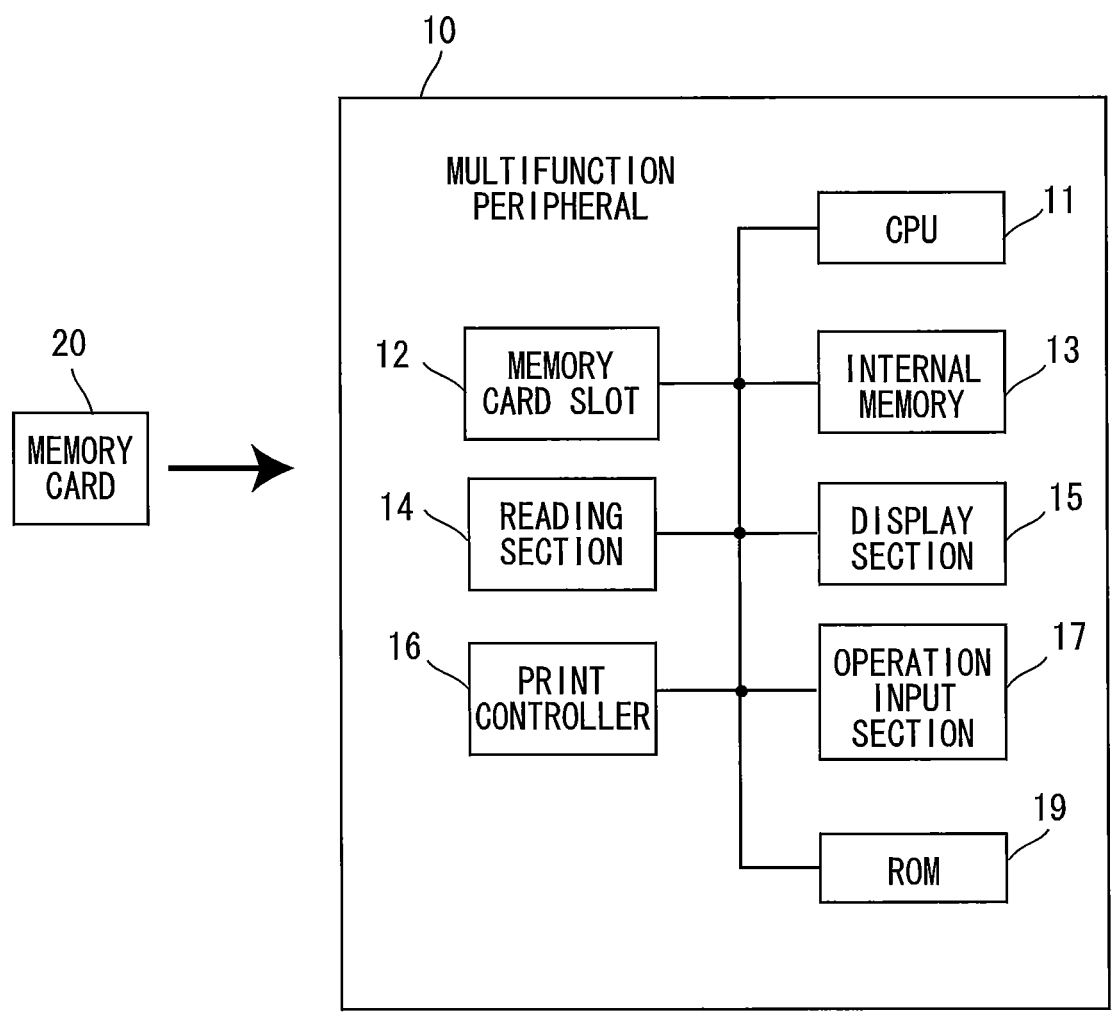
FIG. 1 is a block diagram illustrating a configuration of a multifunction peripheral according to a first embodiment.

FIG. 1 is a block diagram illustrating a configuration of a multifunction peripheral 10 according to a first embodiment.

The multifunction peripheral 10 has a printer function, a scanner function, a copy function, and a facsimile function. The multifunction peripheral 10 includes a CPU 11, a memory card slot 12, an internal memory (RAM) 13, a reading section 14, a liquid crystal display section 15, a print controller 16, an operation input section 17, and a ROM 19, which are connected to one another through signal lines.

The CPU 11 operates according to a program stored in a ROM 19 or an internal memory 13, and totally controls the multifunction peripheral 10 and performs various computations.

The memory card slot 12 can receive insertion of a memory card 20 (non-volatile portable storage medium), such as an SD card or a CF card, that stores an image file.

The internal memory 13 temporarily stores computation results from the CPU 11 or input data.

The reading section 14 is a scanner that reads an image of a document set in a predetermined document read position and generates image data corresponding to the image.

The liquid crystal display section 15 includes a small color liquid crystal display on which an image (including an image representing a character string such as a message) is displayed.

The print controller 16 controls a printing operation in which a color image is formed on a recording sheet by using CMYK color materials (toner or ink).

The operation input section 17 is provided with various operation keys operated by a user. The user inputs information based on the operation of the operation keys to the multifunction peripheral 10 through the operation input section 17. Specifically, the operation input section 17 has up, down, left, and right keys for up, down, left, and right operations and an OK key for decision operation.

The ROM 19 stores various control programs for controlling the multifunction peripheral 10, various settings, initial values, and the like. The ROM 19 also stores compression tables ($DCT_{HQ}(i,j)$ and $DCT_{HC}(i,j)$) described later.

[Operation]

The following describes operation of the multifunction peripheral 10 according to the first embodiment. The multifunction peripheral 10 stores raster type input image data obtained through the scanning operation performed by the reading section 14. The raster type input data is stored as a high-compression PDF data (hereinafter also referred to as high-compression PDF). The high-compression PDF data is one PDF file containing character image data and background image data. The character image data and the background image data have been separately compressed in the PDF file. That is, the high-compression PDF includes compressed background image data and compressed character image data.

The input image includes a plurality of objects. When generating the high-compression PDF, the multifunction peripheral 10 performs JPEG compression on object basis. Each object is compressed in a manner depending on the object, whereby the data size of the object is reduced while suppressing degradation of the input image.

Figure 2:
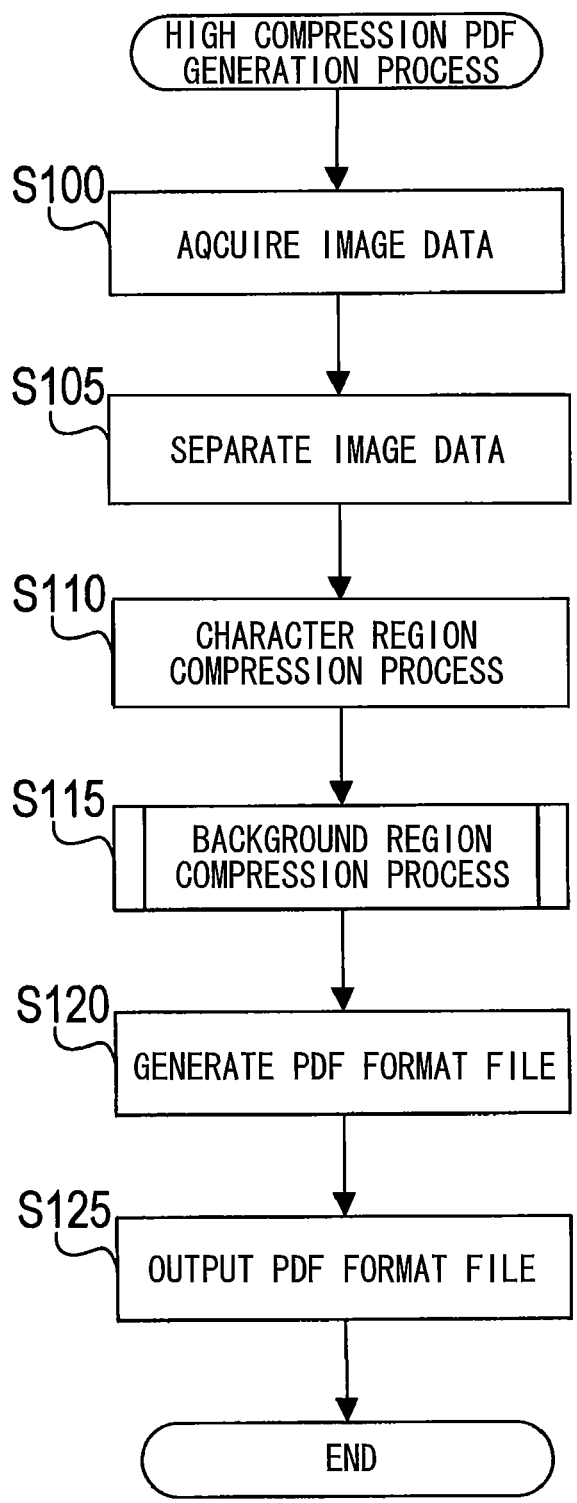
FIG. 2 is a flowchart illustrating a high compression PDF generation process according to the first embodiment.

First, the high-compression PDF generation process for generating the high-compression PDF will be described with reference to a flowchart shown in FIG. 2.

In S100, the CPU 11 of the multifunction peripheral 10 acquires the input image data generated by the reading section 14 and shifts to S105. The input image data is not limited to data generated by the reading section 14, but may be an image file stored in the memory card 20 inserted into the memory card slot 12 or an image file acquired through a network.

In S105, the CPU 11 separates the input image into one background region and one or more character regions and then shifts to S110. Specifically, for example, the CPU 11 divides the input image into a plurality of blocks each having a prescribed size. The CPU 11 determines which of character and photo a block includes based on contrast in the block or the like, for all blocks. Based on a result of the determination, the CPU 11 classifies the blocks into background region and character region.

In S110, the CPU 11 executes a character region compression process to compress a data size of each block in character region and then shifts to S115. Specifically, the CPU 11 generates a mask image from each block in the character region. In the mask image, pixels each representing the character are set to 1 and remaining pixels are set to 0. The CPU 11 compresses the mask images according to a FAX compression algorithm, and stores the compressed mask images in a PDF format.

In S115, the CPU 11 executes a background region compression process to reduce a data size of the background region. The CPU 11 stores the resultant background region in a PDF format, and then shifts to S120. Details of the background region compression process will be described later.

In S120, the CPU 11 combines the mask images of the character region stored in S110 and the background image stored in S115 and stores the resultant image as a PDF format file. Accordingly, a high-compression PDF corresponding to the input image is generated. Thereafter, the CPU 11 shifts to S125.

In S125, the CPU 11 outputs the generated high-compression PDF to an output destination designated by a user and ends the high-compression PDF generation process. The output destination may be the memory card 20 inserted into the memory card slot 12, a PC (not shown) connected to the multifunction peripheral 10 through a network, or a server, such as an FTP server or a web storage, connected to the multifunction peripheral 10 through a network.

Figure 3:
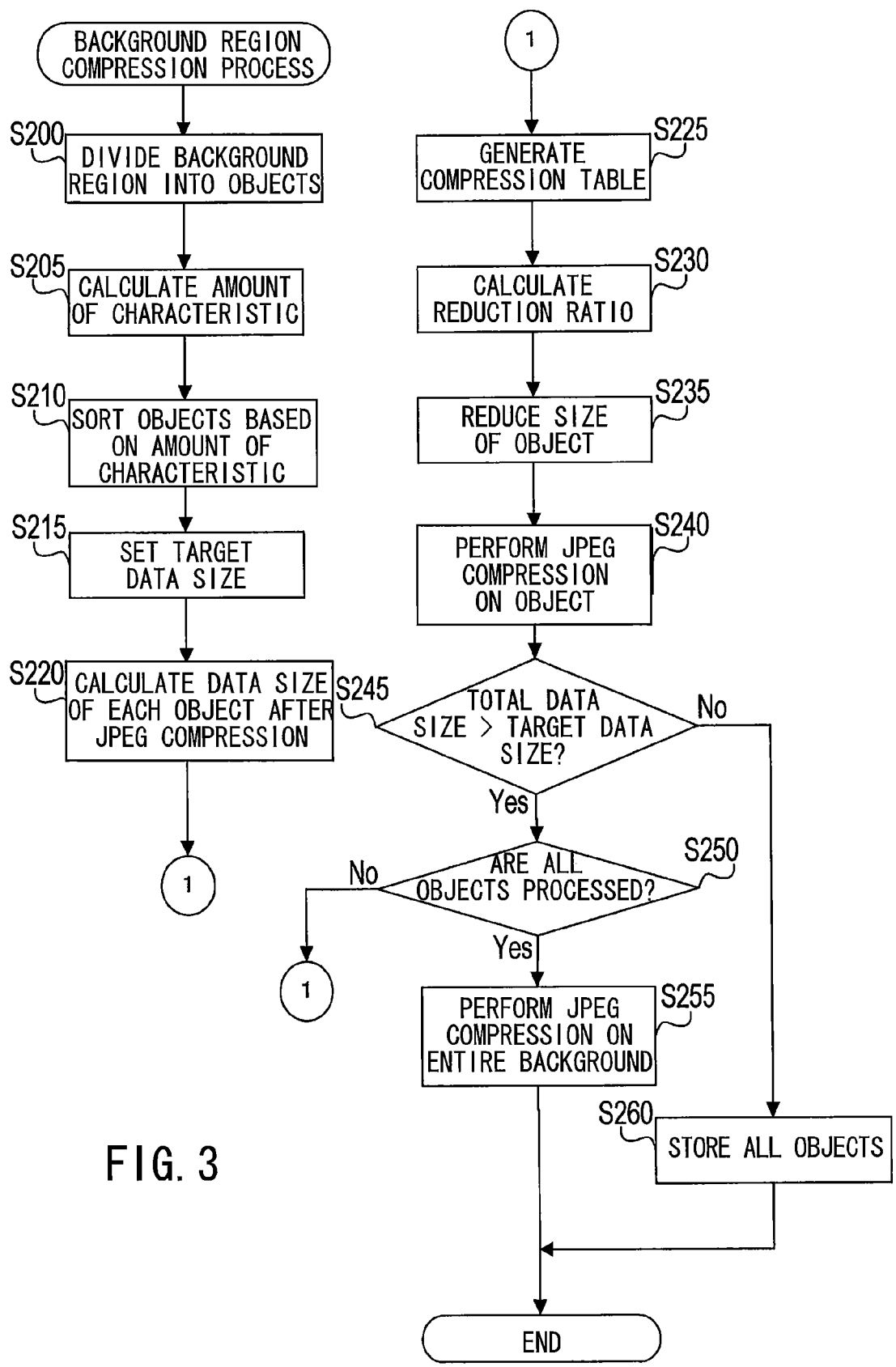
FIG. 3 is a flowchart illustrating a background region compression process according to the first embodiment.

A flowchart of FIG. 3 illustrates the background region compression process called by S115 of the high-compression PDF generation process. As shown in FIG. 3, in S200, the CPU 11 identifies objects constituting the background region and divides the background region into objects.

Specifically, the CPU 11 divides the background region into a plurality of blocks and then sets an edge strength of each object. The edge strength is an index indicating a variation degree of gradations among pixels in the block. The CPU 11 binarizes each block by assigning each block with one of values "ON" and "OFF". That is, the CPU 11 assigns a block with "OFF" when the edge strength of the block is lower than a reference value. The CPU 11 assigns a block with "ON" value when the edge strength of the block is greater than or equal to the reference value. Then, the CPU 11 identifies one continuous region in which all blocks are assigned with "ON", and determines this continuous region as a region where the object exists.

In S205, the CPU 11 calculates an amount of characteristic for each object. The amount of characteristic is an index indicating a degree of change in parameters representing color information among pixels in the object. In other words, the amount of characteristic indicates a degree of variation or a degree of difference in the parameters representing color information among pixels in the object. That is, the amount of characteristic is an index value showing a difference in the parameters among the pixels in the object. The larger the amount of characteristic, the more likely the object is to be degraded in quality when the JPEG compression or the reduction in size is performed on the object.

For example, the parameters representing color information of a pixel may be a luminance (Y) and color differences (Cb, Cr) represented in a YCbCr color space, or a brightness of each color component (R, G, B) represented in an RGB color space.

In the present embodiment, a complication degree and a gradation degree are used as the amount of characteristic.

The complication degree is an index indicating a degree to which the parameters representing color information in pixels of the object are deviated from an average value of the parameters of all the pixels in the object. In the present embodiment, a variance of the luminance (Y) represented in the YCbCr color space for pixels in the object is used as the complication degree.

In a case where the input image is represented in the RGB color space, the CPU 11 converts parameters (R, G, and B) representing the brightness (color components) of each pixel constituting the object into parameters (Y, Cb, and Cr) represented in the YCbCr color space according to the following equations (1) to (3).

$$Y=0.3R+0.6G+0.1B \qquad (1)$$

$$Cb=-0.169R-0.331G+0.5B \qquad (2)$$

$$Cr=0.5R-0.419G+0.081B \qquad (3)$$

According to the following equation (4), the CPU 11 calculates an average value Ave(x, y) of each of Y, Cb, and Cr in a surrounding region of the target pixel. Here, (x, y) indicates coordinates of a target pixel, and P(x, y) indicates a value of one of Y, Cb, and Cr.

$$Ave(x, y) = \frac{\sum_{n=-win}^{n \leq win} \sum_{n=-win}^{n \leq win} P(x+m, y+n)}{(2 \times win)^2} \qquad (4)$$

Further, the CPU 11 calculates, according to the following equation (5), a variance E (x, y) of each of the values of Y, Cb, and Cr in the target pixel based on the average value Ave (x, y).

$$E(x, y) = \frac{\sum_{n=-win}^{n \leq win} \sum_{n=-win}^{n \leq win} (P(x+m, y+n) - Ave(x, y))^2}{(2 \times win)^2} \qquad (5)$$

According to the equations (4) and (5), variances are calculated for an region in which the target pixel is located at a center. In the equations (4) and (5), "win" is a variable that defines a range of the region. In the present embodiment, "win" is set to 1. However, "win" may not be limited to 1.

The CPU 11 calculates, for all the pixels constituting the object, the variance E(x,y) of each of Y, Cb, and Cr and calculates a maximum value $E_{max}$ of the variance E(x,y) and an average value $E_{Avg}$ among all the pixels in the object.

The CPU 11 sets the complication degree to the maximum value $E_{max}$ (or the average value $E_{Avg}$) of the variance of Y among all the pixels in the object. Alternatively, the CPU 11 may set the complication degree to the maximum value $E_{max}$ (or the average value $E_{Avg}$) of the variance of Cb or Cr among all the pixels in the object. Further alternatively, in place of Y, Cb, and Cr, the CPU 11 may set the complication degree to a variance of the brightness of each of R, G, and B (or its maximum variance or average among pixels in the object).

On the other hand, the gradation degree is calculated based on a distribution (histogram) of luminance values (value of Y) for pixels constituting the object. In the first embodiment, Y is an integer value ranging from 0 to 255, for example. Of course, in place of the luminance value, a histogram of the color difference values (values of Cb or Cr) may be used, for example.

The CPU 11 calculates the number of pixels having respective luminance values to generate a histogram, for each object. Further, the CPU 11 divides the luminance value range of 0 to 255 into a plurality of small regions and calculates a total number (frequency) of pixels having respective luminance values belonging to each small region.

Further, the CPU 11 identifies the maximum number of pixels among the numbers of pixels having respective luminance values belonging to the small region, for each small region. Further, the CPU 11 identifies the luminance value corresponding to the maximum number (more in detail, width of the luminance value having the luminance value corresponding to the maximum number). Then, the CPU 11 calculates, for each small region, an area of the region by multiplying the maximum number of pixels and the identified luminance value (the width of the luminance value). The CPU 11 calculates a frequency rate by dividing the calculated frequency by the area of the region.

The frequency rate represents a degree of change of the histogram of the luminance in each small region. That is, the higher the frequency rate, the lower the change degree becomes. On the other hand, the lower the frequency rate, the higher the change degree becomes. Then, the CPU 11 identifies the maximum frequency rate among the frequency rates of the respective small regions and sets an inverse number of the maximum frequency rate as the gradation degree. That is, the gradation degree indicates a degree of spread of the luminance values in a prescribed range.

In S210, the CPU 11 sorts the objects based on the amount of characteristic and data size such that the objects are arranged in the ascending order of the amount of characteristic, and sets the result of the sort as a process order for the objects.

Specifically, the CPU 11 first sets an order obtained by sorting the objects in ascending order of the complication degree. Here, in a case where there exists a plurality of objects having the same complication degree after sorting in ascending order of complication degree, the CPU 11 further sorts these objects in ascending order of the gradation degree. In a case where there exists a plurality of objects having the same complication degree and same gradation degree after sorting in ascending order of complication degree and sorting in ascending order of the gradation degree, the CPU 11 further sorts these objects in ascending order of the data size and obtains the process order. The CPU 11 sets the resultant order of the objects as a process order. The compression process described later is performed in the process order.

Alternatively, the CPU 11 may first set an order obtained by sorting the objects in ascending order of the gradation. Here, in a case where there exists a plurality of objects having the same gradation degree after sorting in ascending order of the gradation, the CPU 11 further sorts these objects in ascending order of the complication degree. In this case, the data size may be considered when the process order is determined as explained above. The CPU 11 sets the resultant order of the objects as a process order.

In S215, the CPU 11 estimates a data size of the entire background region after a JPEG compression is performed on the entire background region at a prescribed compression rate (that is, using a prescribed weight). The CPU 11 sets a target data size of the background region to the estimated data size, and then shifts to S220. The target data size may be set based on a compression rate value received by a user operation through the operation input section 17.

In S220, the CPU 11 calculates a data size of each object after a JPEG compression is performed on the object at the same compression rate (using the same weight) as that used in S215. Then, the CPU 11 stores, in the internal memory 13, the data size of the each object if the JPEG compression is performed on the object in association with the corresponding object, selects the first object in the process order determined in S210, and shifts to S225.

In S225, the CPU 11 generates a compression table (DCT (i,j)) based on the complication degree (variance) of the currently selected object. The compression table registers weights that are used in the JPEG compression for the presently selected object. Specifically, the compression table registers 64 weights corresponding respectively to frequency components of the image. The weights are represented in a 8×8 matrix. Here, (i,j) is a coordinate of each weight in the matrix. That is, i and j correspond respectively to a row and a column of the matrix and have a value ranging from 0 to 7.

The compression table is used in a specific step in the JPEG compression process. Specifically, the compression table is used in quantization to be performed after a discrete cosine transformation is performed.

The CPU 11 generates the compression table according to the following equation (6).

$$DCT(i,j) = \frac{E_{Avg}}{E_{max}} \times DCT_{HQ}(i,j) + \frac{(1-E_{Avg})}{E_{max}} \times DCT_{HC}(i,j) \quad (6)$$

In the equation (6), $DCT_{HQ}(i,j)$ is a compression table for a highest quality JPEG compression (JPEG compression at a lowest compression rate). Further, $DCT_{HC}(i,j)$ is a compression table for a JPEG compression at a highest compression rate. These compression tables are previously stored in the ROM 19 or the like provided in the multifunction peripheral 10.

The CPU 11 generates a compression table corresponding to the luminance and a compression table corresponding to the color differences (Cb, Cr) by using the maximum value $E_{max}$ of the variance E(x,y) corresponding to the luminance Y and an average value $E_{Avg}$ of the variance E(x,y) corresponding to the luminance Y to according to the equation (6).

Only the compression table corresponding to the luminance may be generated.

FIG. 4A is an example of a compression table corresponding to the luminance for the highest quality JPEG compression, and FIG. 4B is an example of a compression table corresponding to the luminance for the JPEG compression at the highest compression rate. FIG. 4C is an example of a compression table corresponding to the color difference for the highest quality JPEG compression, and FIG. 4D is an example of a compression table corresponding to the color difference for the JPEG compression at the highest compression rate.

The compression tables are generated as described above whereby the JPEG compressions is performed on the object depending on the amount of characteristic corresponding to the object. Specifically, when one object has an amount of characteristic smaller than an amount of characteristic of another object, the JPEG compression is performed on the one object at a compression rate higher than a compression rate at which the JPEG compression is performed on the another object. That is, the smaller the amount of characteristics of the object is, at the higher compression rate the JPEG compression is performed on the corresponding object.

In S230, the CPU 11 calculates a reduction ratio (Scale) of the object based on the variance of the luminance according to the following equation (7) and then shifts to S235. As a result, the reduction ratio (Scale) of the object is determined so as to fall within a range from 25% to 100%.

$$Scale = \frac{(1-E_{Avg})}{E_{max}} \times 75 + 25 \quad (7)$$

Because the reduction ratio (Scale) is determined as described above, the scale of the object is determined depending on the amount of characteristic. That is, when one object has an amount of characteristic smaller than an amount of characteristic of another object, a reduction ratio of the one object is higher than a reduction ratio of the another object. That is, the smaller the amount of characteristics of the object is, the higher the reduction ratio of the object is set to.

In S235, the CPU 11 reduces the size of the currently selected object at the reduction ratio determined in S230 and then shifts to S240.

In S240, the CPU 11 performs the JPEG compression on the currently reduced object that is reduced in S235 by using the compression table generated in S225 and shifts to S245. Specifically, in S240 the CPU 11 performs a discrete cosine transformation on the reduced object and quantizes the transformed object by using the compression table generated in S225. The CPU 11 may further perform a deflate compression on the JPEG-compressed object.

In S245, the CPU 11 identifies data sizes of objects. Specifically, for the objects on which the reduction and compression process (S235 and S240) is performed, the CPU 11 identifies data sizes of each resultant object (each compressed object) by the reduction and compression process (processes S235 and S240). Here, the reduction and compression process indicates a process for reducing data size of the object. Further, for the objects on which the reduction and compression process (S235 and S240) has not been performed, the CPU 11 identifies data sizes of each original object. Then, the CPU 11 determines whether or not a total sum of the identified data sizes is larger than the target data size of the background region set in S215. In other words, the CPU 11 estimates data size of image data to be generated by using the compressed objects, and determines whether the estimated data size is larger than the target data size. When an affirmative determination is made (S245: YES), the CPU 11 shifts to S250. When a negative determination is made (S245: NO), the CPU 11 shifts to S260.

As a result, even though the reduction and compression process (S235-S240) for all the objects is not completed, the CPU 11 shifts to S260 when the negative determination is made in S245, and the reduction and compression process (S235-S240) is omitted for some objects.

In S250, the CPU 11 determines whether or not processes for all the objects are completed. When an affirmative determination is made (S250: YES), the CPU 11 shifts to S255. When a negative determination is made (S250: NO), the CPU 11 selects a next object according to the process order determined in S210 and then shifts to S225.

In S255, the CPU 11 performs a JPEG compression on the entire background region using the same weight as that used in S215, stores the resultant background region in a PDF format, and ends the background region compression process.

On the other hand, in S260, the CPU 11 stores the background region by storing all the objects in a PDF format. Specifically, for the objects on which the reduction and compression process (S235 and S240) is performed, each resultant object is stored in the PDF format. For the objects on which the reduction and compression process (S235 and S240) has not been performed, each object itself is stored in the PDF without change (without reduction in size and without compression).

Second Embodiment

Figure 5:
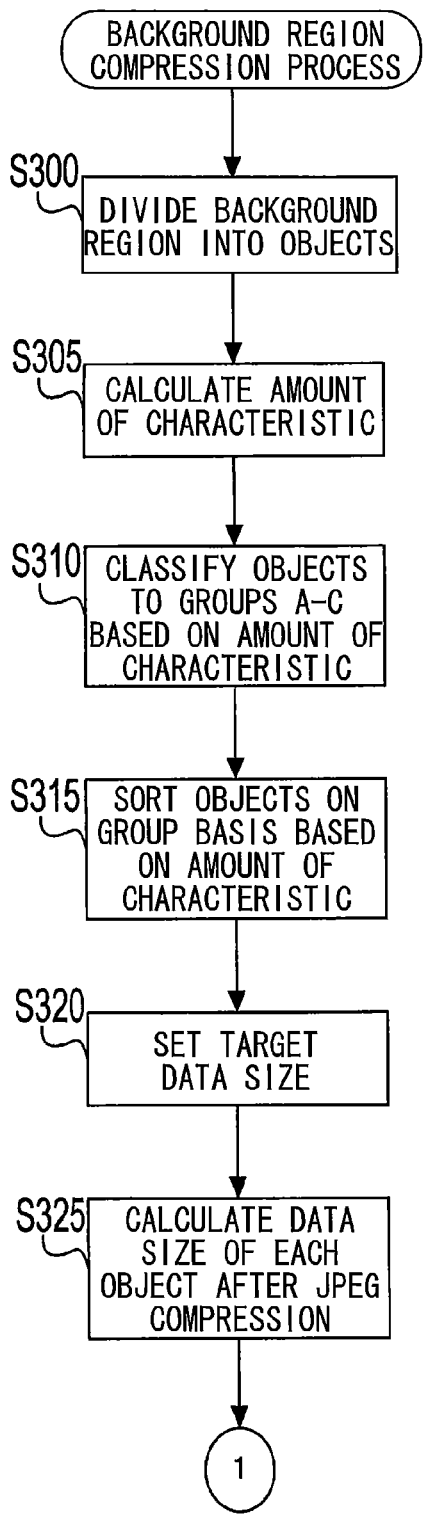
FIG. 5 is a flowchart illustrating a part of a background region compression process according to a second embodiment.
Figure 5:
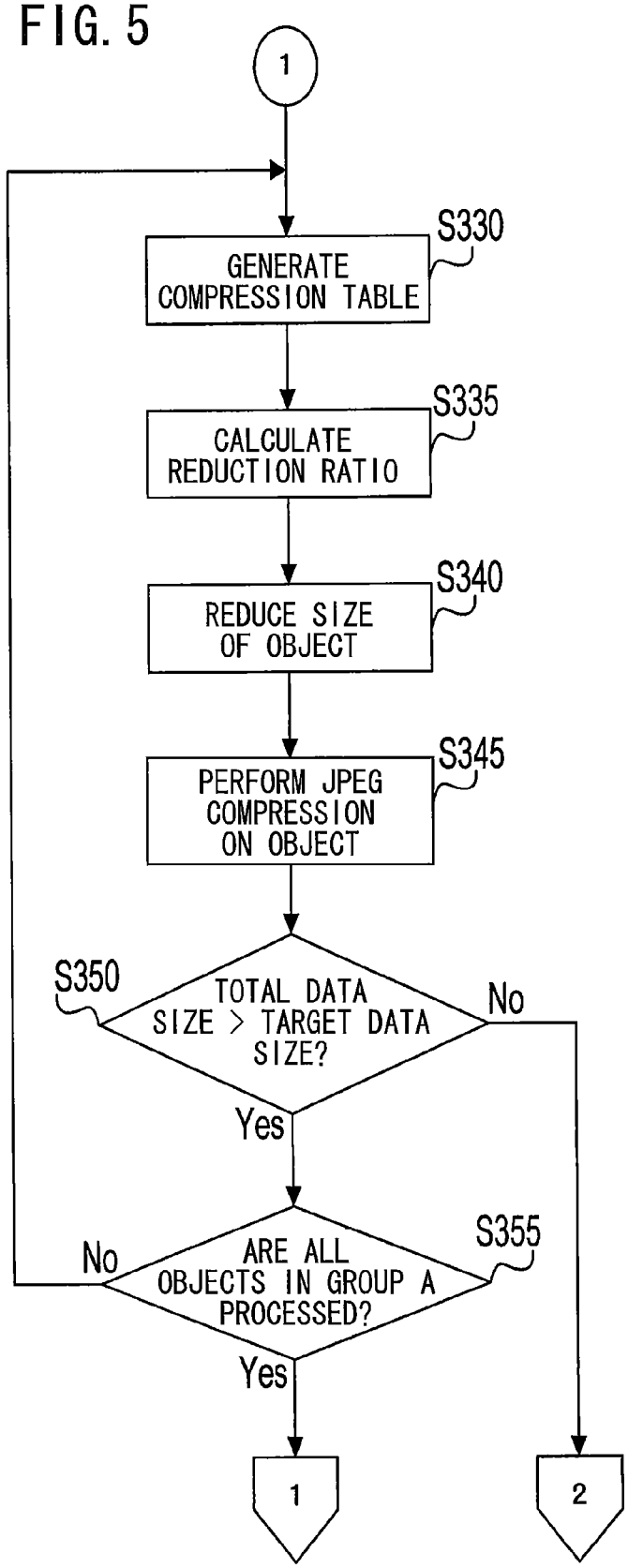
Figure 6:
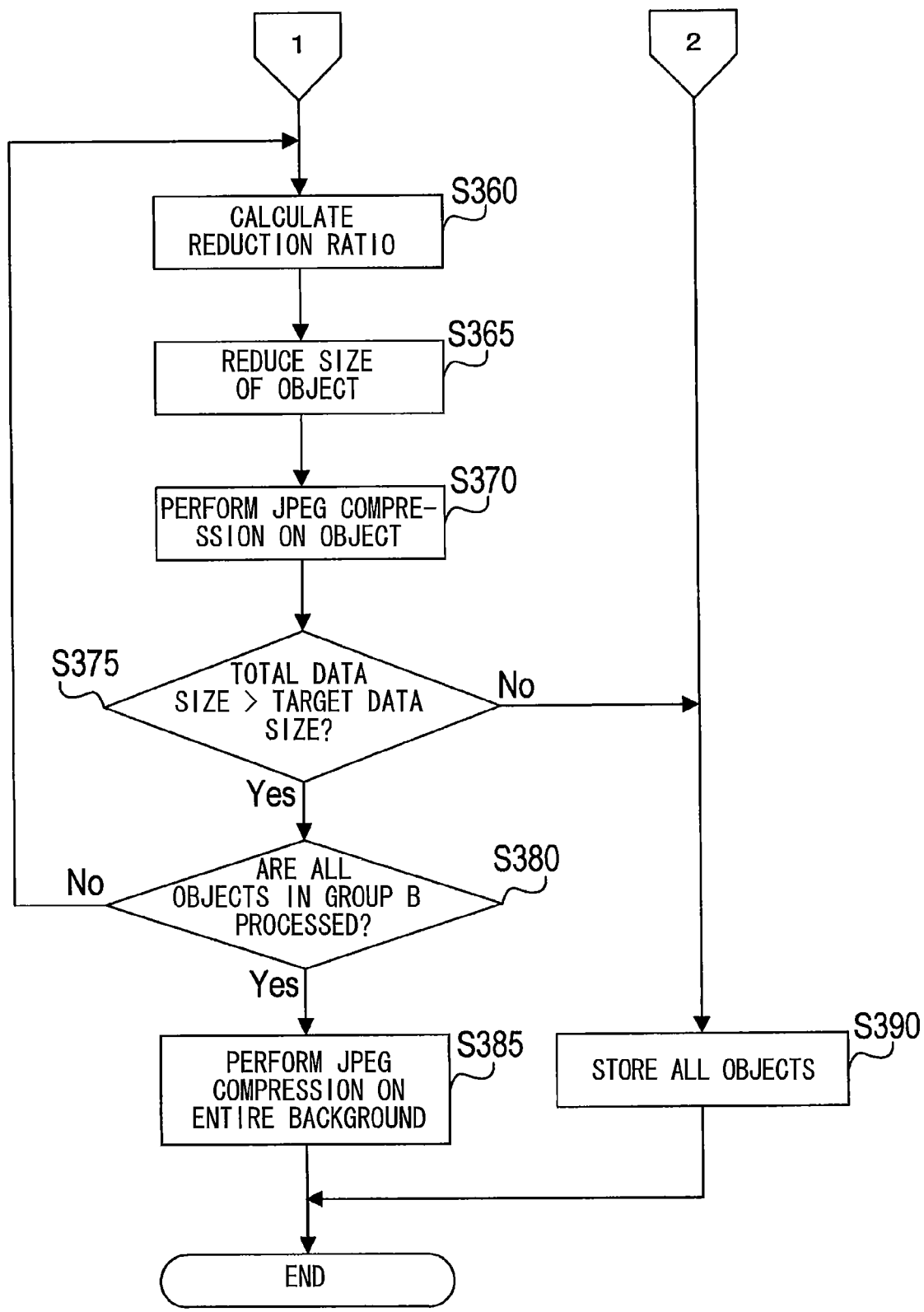
FIG. 6 is a flowchart illustrating a remaining part of the background region compression process according to the second embodiment.

The multifunction peripheral 10 according to a second embodiment will be described. The multifunction peripheral 10 according to the second embodiment has the same configuration as that of the multifunction peripheral 10 of the first embodiment and performs the same high-compression PDF generation process as that in the first embodiment, but partially differs in the background region compression process. Hereinafter, a background region compression process in the second embodiment will be described using flowcharts of FIGS. 5 and 6.

Processes S300 and S305 are the same as processes of S200 and S205 (FIG. 3) of the background region compression process according to the first embodiment, and descriptions thereof will be omitted.

In S310, the CPU 11 of the multifunction peripheral 10 classifies the object to one of groups A to C based on the complication degree and the gradation degree of the object and then shift to S315.

Specifically, when an object has a gradation degree lower than a prescribed upper limit value and has a complication degree lower than a prescribed upper limit value, the object is classified to the group A. When an object has a gradation degree lower than the prescribed upper limit value and has a complication degree higher than or equal to the prescribed upper limit value, the object is classified to the group B. When an object has a gradation degree higher than or equal to the prescribed upper limit value and has a prescribed gradation degree higher than or equal to the upper limit value, the object is classified to the group C.

Because the complication degree of the object classified into the group B is higher than or equal to the upper limit value, there is a high possibility that the image deteriorates significantly if the image is compressed by JPEG. Thus, in the subsequent processes, the JPEG compression is not performed on the objects classified in the group B.

Further, both the degradation degree and the complication degree of the object classified into the group C is higher than or equal to their respective upper limit values. There is a high possibility that the image deteriorates significantly if the image is compressed by JPEG or if the image is reduced. Thus, in the subsequent processes, neither the JPEG compression nor the reduction is performed on the objects classified in the group C.

In S315, the CPU 11 sorts the objects for each of the groups A to C to arrange the objects in an ascending order of the amount of characteristic and sets the result of sort as a process order for the objects.

Specifically, for each group, the CPU 11 first sorts the objects in an ascending order of the complication degree. When there exist a plurality of objects having the same complication degree, the CPU 11 further sorts these objects in an ascending order of the gradation degree. When there exist a plurality of objects having the same complication degree and the same gradation degree, the CPU 11 further sorts the objects in an ascending order of the data size. The CPU 11 sets the resultant order of the objects as a process order Alternatively, for each group, the CPU 11 may first sort the objects in an ascending order of the gradation degree. In this case, when there exists a plurality of objects having the same gradation degree, the CPU 11 further sorts these objects in an ascending order of the complication degree. The CPU 11 sets the resultant order of the objects as a process order.

The process S320 is the same as that of S215 (FIG. 3) in the background region compression process according to the first embodiment, so descriptions thereof will be omitted.

In S325, the CPU 11 calculates a data size of each object after a JPEG compression is performed on the object at the compression rate the same as that in the JPEG compression of S320. Then, the CPU 11 stores the data size of the each compressed object if the JPEG compression is performed in an array such that each data size is associated with the corresponding object. Further, the CPU 11 selects a first object in the group A according to the process order determined in S315, and shifts to S330.

The processes S330-S345 are the same as the processes S225-S240 (FIG. 3) in the background region compression process according to the first embodiment, so descriptions thereof will be omitted. Hereinafter, the combination of the processes S340 and S345 is referred to as a reduction and compression process A.

In S350, the CPU 11 identifies data sizes of objects. Specifically, for the objects in the group A on which the reduction and compression process A has been performed, the CPU 11 identifies data sizes of each resultant object. Further, for other objects on which the reduction and compression process A has not been performed, the CPU 11 identifies data sizes of each original object. Then, the CPU 11 calculates the total sum of the identified data sizes and determines whether or not a total sum of the data sizes is larger than the target data size of the background region set in S320. When an affirmative determination is made (S350: YES), the CPU 11 shifts to S355. When a negative determination is made (S350: NO), the CPU 11 shifts to S390.

In S355, the CPU 11 determines whether or not the processes S330-S345 are performed for all the objects belonging to the group A. When an affirmative determination is made (S355: YES), the CPU 11 selects a first object in the group B according to the process order determined in S315 and then shifts to S360. On the other hand, when a negative determination is made (S355: NO), the CPU 11 selects a next object in the group A in the process order determined in S315 and then shifts to S330.

The processes S360 and S365 are the same as those of S225 and S230 (FIG. 3) in the background region compression process according to the first embodiment, so descriptions thereof will be omitted.

In S370, the CPU 11 performs a JPEG compression on the currently reduced object which has been reduced in S365 and then shifts to S375. At this time, the CPU 11 may perform a JPEG compression using the compression table corresponding to the highest image quality. In this case, the objects in the group B are compressed in the highest image quality. Hereinafter, the processes S365 and S370 are referred to as a reduction and compression process B. That is, the reduction and compression process B is performed on the objects in the group B.

In S375, for the objects belonging to the group A on which the reduction and compression process A has been performed, the CPU 11 identifies data sizes of each resultant object. For the objects belonging to the group B on which the reduction and compression process B has been performed, the CPU 11 identifies data sizes of each objects. For the objects on which neither the reduction and compression process A nor B has been performed, the CPU 11 identifies data sizes of each original object. Then, the CPU 11 determines whether or not a total sum of the identified data sizes is larger than the target data size of the background region set in S320. When an affirmative determination is made (S375: YES), the CPU 11 shifts to S380. When a negative determination is made (S375: NO), the CPU 11 shifts to S390.

In S380, the CPU 11 determines whether or not processes S360-S370 are performed for all the objects belonging to the group B. When an affirmative determination is made (S380:

YES), the CPU 11 shifts to S385. When a negative determination is made, (S380: NO), the CPU selects a next object to be processed in the group B according to the process order determined in S315 and then shifts to S360.

In S385, the CPU 11 performs a JPEG compression on the entire background region using the same weight as that used in S325, stores the resultant background region in a PDF format, and ends the background region compression process.

On the other hand, in S390, the CPU 11 stores the background region by storing all the objects in a PDF format. Specifically, for the objects on which the reduction and compression process A or B has been performed on, each resultant object is stored in the PDF format. For the objects on which neither the reduction and compression process A nor B has been performed, each original object itself is stored in the PDF without change (without reduction in size and without compression).

As described above, in the background compression process according to the second embodiment, the reduction and compression process A or B is performed only on the objects belonging to the groups A or B, and no reduction and compression process is performed on the objects belonging to the group C.

Third Embodiment

Figure 7:
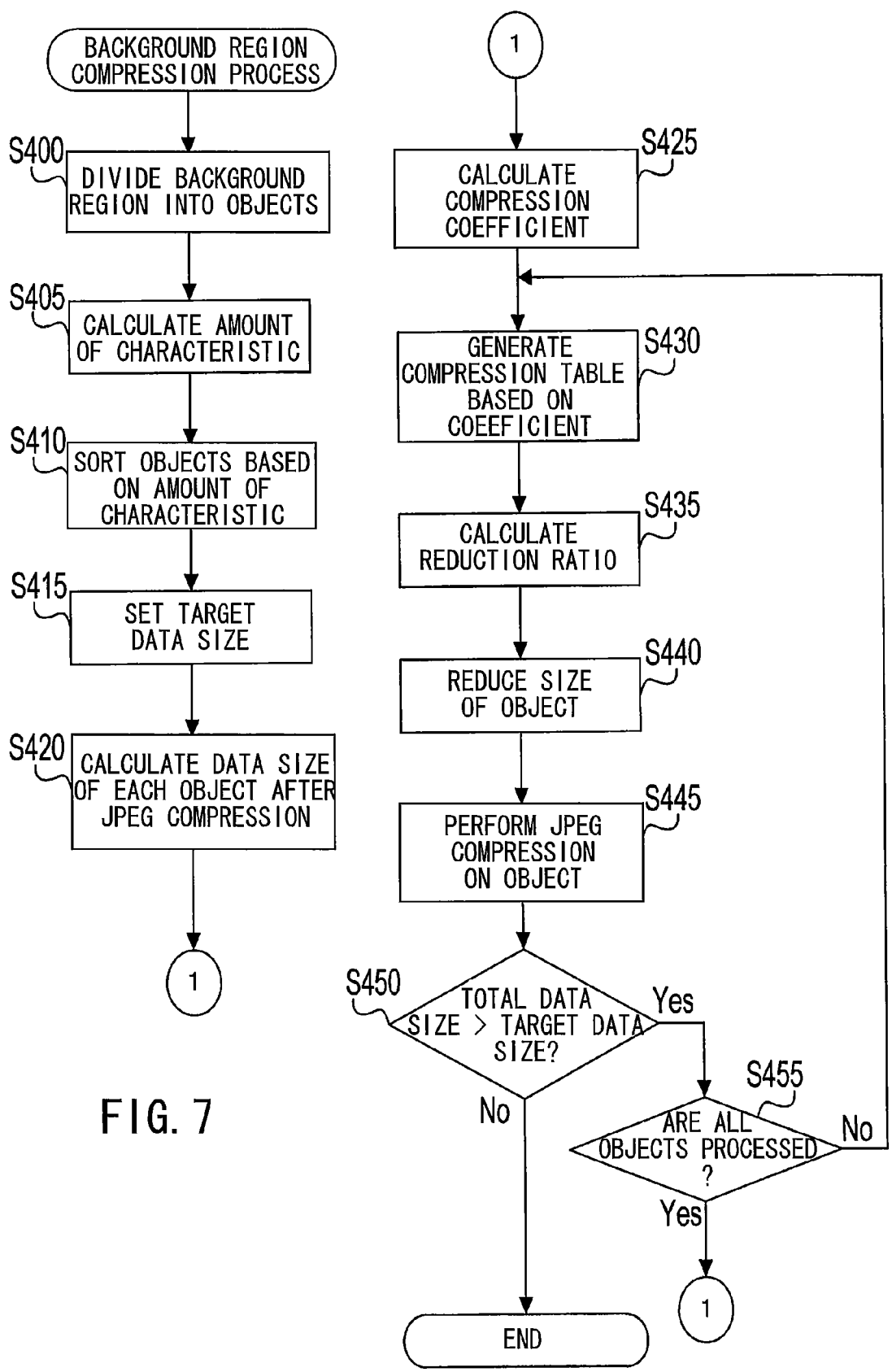
FIG. 7 is a flowchart illustrating a background region compression process according to a third embodiment.

The multifunction peripheral 10 according to a third embodiment will be described. The multifunction peripheral 10 according to the third embodiment has the same configuration as that of the multifunction peripheral 10 of the first embodiment and performs the same high-compression PDF generation process as that in the first embodiment, but partially differs in the background region compression process. Hereinafter, a background region compression process in the third embodiment will be described using the flowchart of FIG. 7.

The processes S400-S420 are the same as processes of S200-S220 (FIG. 3) of the background region compression process according to the first embodiment, and descriptions thereof will be omitted.

In S425, the CPU 11 of the multifunction peripheral 10 calculates a compression coefficient R. In the following, the number I (I=1, 2, . . . ) indicates the number of times of the reduction and compression process (the number of times of the combinations of processes S440 and S445) to be performed for each object. More specifically, I is a value adding 1 to the number of the combinations of the reduction and compression process (S440 and S445) performed on the current object. So, I is initially set to 1 because the reduction and compression process (S440 and S445) is not performed yet. B denotes a reference coefficient, and G denotes a coefficient increase rate. The compression coefficient R is calculated according to the following equation.

$$R = B + (I \times G)$$

For example, in the third embodiment, B and G are set to 1.0 and 0.1, respectively.

Further, the CPU 11 selects a first object in the process order determined in S410 and then shifts to S430.

In S430, the CPU 11 generates the compression table (DCT(i,j)) based on the compression coefficient R calculated in S425 and the complication degree of the object being selected by the following equation (8).

$$DCT(i, j) = \left( \frac{E_{Avg}}{E_{max}} \times DCT_{HQ}(i, j) + \frac{(1 - E_{Avg})}{E_{max}} \times DCT_{HC}(i, j) \right) \times R \quad (8)$$

In the third embodiment, the CPU 11 is configured to perform the reduction and compression process (S440 and S445) on each object the plurality of times. Because the compression table is generated using the compression coefficient R as described above, the compression rate of the JPEG compression for each object is increased each time the reduction and compression process for all objects makes one round. That is, because the compression table is changed depending on the number I, the compression rates vary according to the number of times of the reduction and compression process performed on the current object.

Similarly to the first embodiment, the CPU 11 may generate a compression table corresponding to the luminance (Y) and a compression table corresponding to the color differences (Cb, Cr) or may generate only the compression table corresponding to the luminance.

The process S435 is the same as processes S230 (FIG. 3) of the background region compression process according to the first embodiment, and descriptions thereof will be omitted. The process S445 is basically the same as the process S240, but the JPEG compression is performed by using the compression table generated in S430.

In S450, the CPU 11 identifies data sizes of objects. Specifically, for the objects on which the reduction and compression process (S440 and S445) has been performed, the CPU 11 identifies data sizes of each resultant object. For the other objects on which the reduction and compression process S440 and S445 has not been performed, the CPU 11 identifies data sizes of each original object. In the third embodiment, the reduction and compression process is performed repeatedly by changing the reduction coefficient (by changing the number I). Thus, for the objects on which the reduction and compression process (S440 and S450) is performed at least one time, the CPU 11 selects the respective latest compressed object. Here, the respective latest compressed object is a compressed object by the reduction and compression process with the current number I when the corresponding original object has been compressed by the reduction and compression process with the current number I whereas the respective latest compressed object is a compressed object by the compressed object by the reduction and compression process with the previous number I−1 when the corresponding original object has not been compressed by the reduction and compression process with the current number I. For example, when the number I=3, and when the first object in the process order is selected as the current object, the CPU 11 selects the data size of the currently compressed object (that is, the first object in the process order) by the current reduction and compression process (S440 and S450) with I set to 3, and selects the data size of other compressed objects by the reduction and compression process (S440 and S450) with I set to 2.

Then, the CPU 11 calculates a total sum of the identified data sizes and determines whether or not the total sum of the data sizes is larger than the target data size of the background region set in S415. When an affirmative determination is made (S450: YES), the CPU 11 shifts to S455. When a negative determination is made (S450: NO), the CPU 11 ends the background region compression process.

When ending the background region compression process, the CPU 11 stores the background region by storing all the objects corresponding to the objects that the CPU 11 selected to calculate data size in S450 in a PDF format. Specifically, for the objects on which the reduction and compression process (S440 and S445) has been performed, each resultant object (each respective latest compressed object by the respective latest reduction and compression process (S440 and S445) whose data size is identified in S450) is stored in the PDF format. For the objects for which the reduction and compression process (S440 and S445) has not been performed, each object itself is stored in the PDF without change (without reduction in size and without compression). As a modification, in S450, for the objects on which reduction and compression process (S440 and S445) with the latest number I is not performed, the CPU 11 selects data size of each original object. For example, when the latest number I=3, and when the first object in the process order is selected in the process order, the CPU 11 selects the data size of the first compressed object (corresponding to the first object in the process order) by the reduction and compression process (S440 and S445) with I set to 3, and selects data size of original object for the objects on which the reduction and compression process with I set to 2 is performed but the reduction and compression process with I set to 3 is not performed. In this case, when ending the background region process, for the objects on which the reduction and compression process (S440 and S450) with the latest number I is performed, the CPU 11 stores each resultant object in a PDF file, and for the objects on which the reduction and compression process (S440 and S445) with latest number I is not performed, the CPU 11 stores each original object ion the PDF file.

In S455, the CPU 11 determines whether or not processes S430-445 are completed for all the objects. When an affirmative determination is made (S455: YES), the CPU 11 shifts to S425. In this case, the CPU 11 selects a first object according to the process order and increments the number I. In this case, when S425 is performed, the CPU 11 calculates the compression coefficient R based on the incremented number I. In other words, the affirmative determination in S455 indicates that the reduction and compression process for all the objects makes one round. When a negative determination is made (S455: NO), the CPU 11 selects a next object to be processed according to the process order determined in S410 and then shifts to S430.

When the reduction and compression process is repeatedly performed for each object over a certain number of times and when the total sum of the data sizes of the objects does not reach the target data size, the entire background region may be subjected to JPEG compression using the same weight as that used in S420 and stored in a PDF format.

As described above, in the background region compression process according to the third embodiment, the compression coefficient R is increased each time the reduction and compression process for all the objects makes one round. Thus, each time the reduction and compression process for all the objects makes one round, the JPEG compression is performed on the objects at a higher compression rate.

Fourth Embodiment

Figure 8:
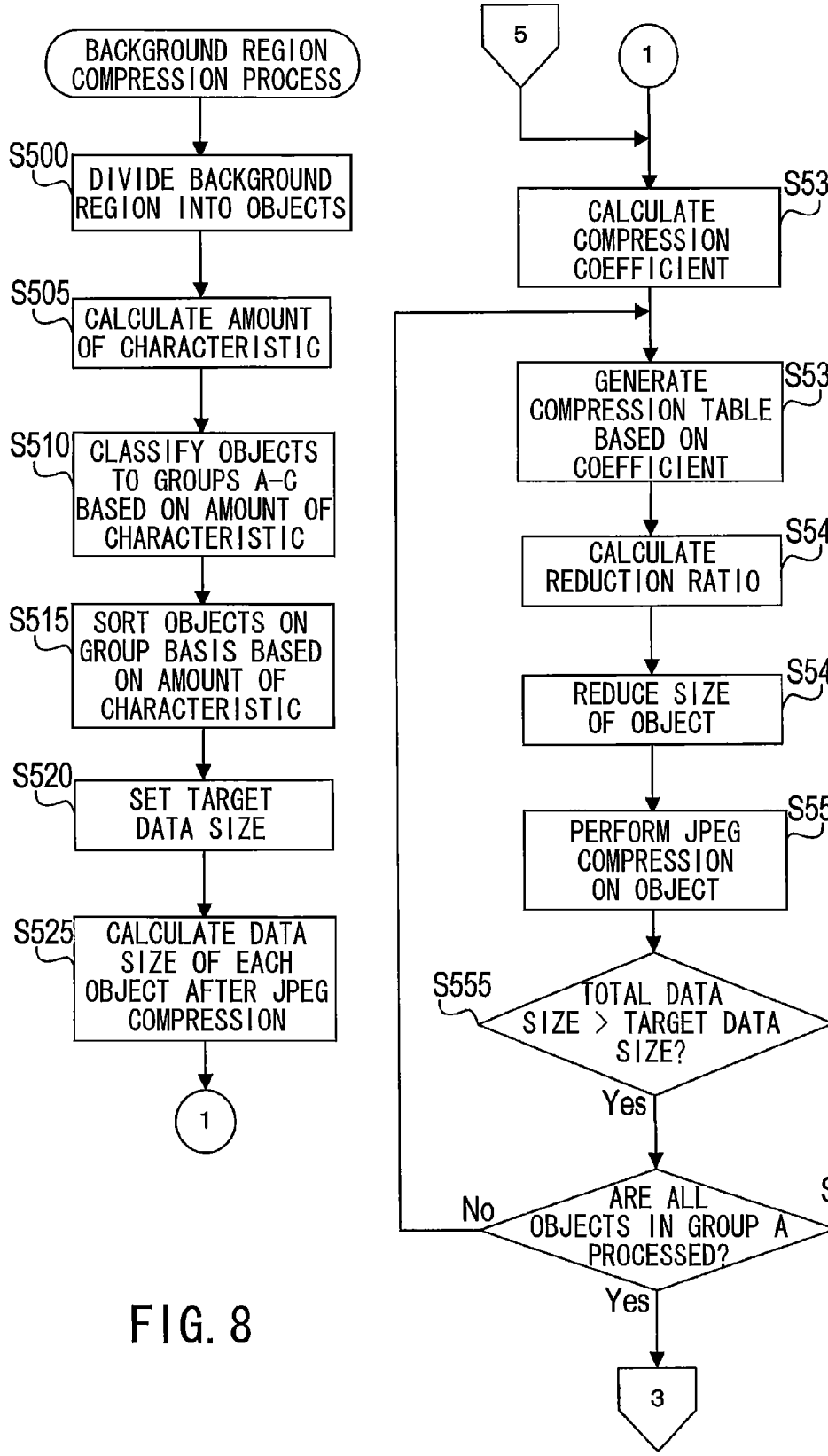
FIG. 8 is a flowchart illustrating a part of a background region compression process according to a fourth embodiment.
Figure 9:
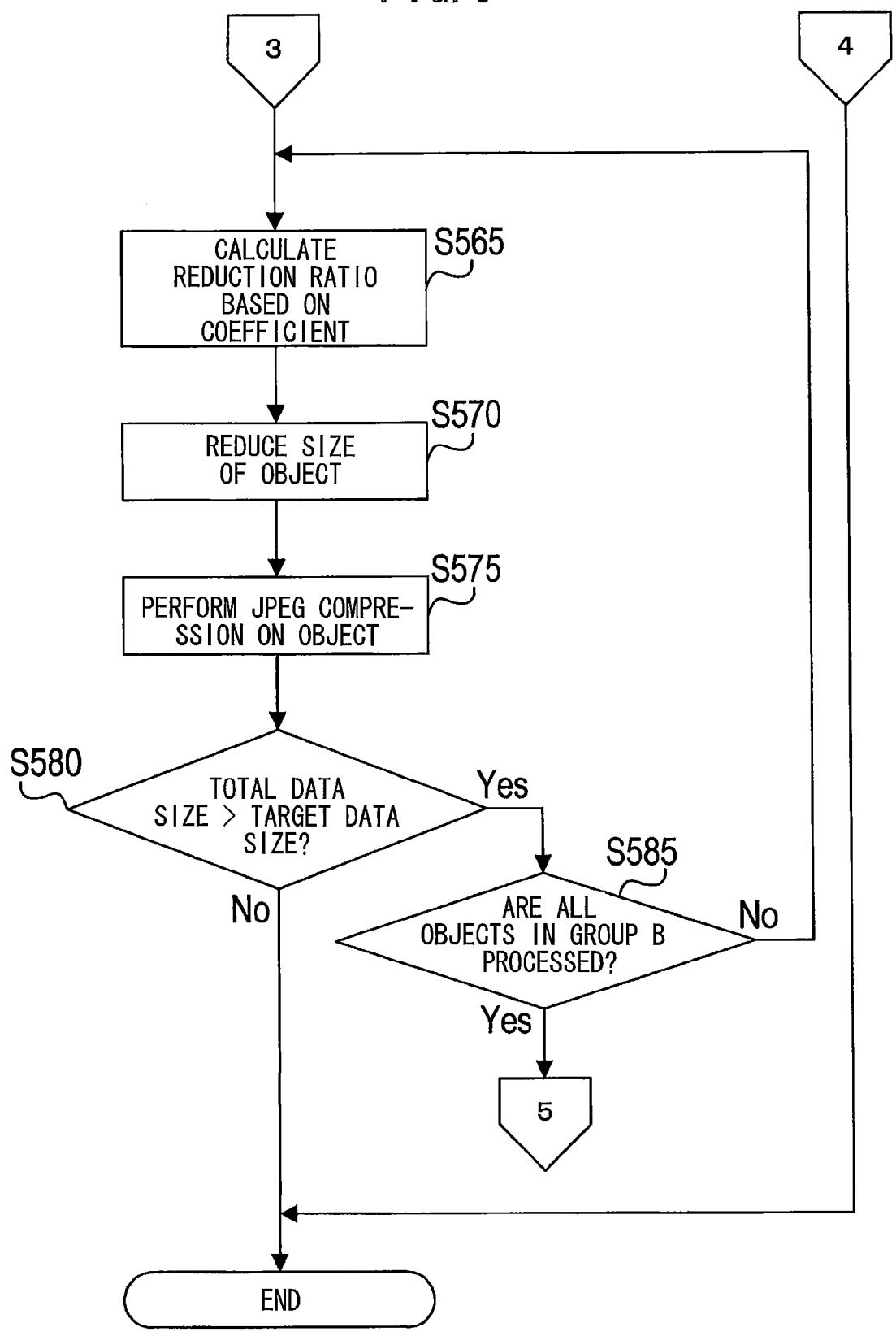
FIG. 9 is a flowchart illustrating a remaining part of the background region compression process according to the fourth embodiment.

The multifunction peripheral 10 according to a fourth embodiment will be described. The multifunction peripheral 10 according to the fourth embodiment has the same configuration as that of the multifunction peripheral 10 of the first embodiment and performs basically the same high-compression PDF generation process as that in the first embodiment, but partially differs in the background region compression process. Hereinafter, a background region compression process in the fourth embodiment will be described using flowcharts of FIGS. 8 and 9.

The processes S500-S525 are the same as the processes S300-S325 (FIG. 5) of the background region compression process according to the second embodiment, and descriptions thereof will be omitted.

In S530, the CPU 11 of the multifunction peripheral 10 calculates a compression coefficient $R_A$ corresponding to the group A and a compression coefficient $R_B$ corresponding to the group B.

Specifically, the number I (I=1, 2, . . . ) indicates the number of times of a reduction and compression process A (a combination of processes S545 and S550) for the objects belonging to the group A or the number of times of the reduction and compression process B (a combination of processes S570 and S575) for the objects belonging to the group B. More specifically, I is a value adding 1 to the number of reduction and compression process A or B performed on the current object. So, I is initially set to 1 because the reduction and compression process (A or B) is not performed. B denotes a reference coefficient, $G_A$ denotes a coefficient increase rate for the group A, and $G_B$ denotes a coefficient increase rate for the group B. Compression coefficients $R_A$ and $R_B$ are calculated according to the following equations, respectively.

$$R_A = B + (I \times G_A)$$

$$R_B = B + (I \times G_B)$$

For example, in the fourth embodiment, B, $G_A$, and $G_B$ are set to 1.0, 0.1, and 0.05, respectively.

Further, the CPU 11 selects a first object in the group A according to the process order determined in S510 and then shifts to S535.

Similarly to S430 of the background region compression process according to the third embodiment, in S535 the CPU 11 generates the compression table (DCT(i,j)) according to the equation (8). In this case, the compression coefficient $R_A$ is substituted into the compression coefficient R in the equation (8).

As described above, the compression table is generated using the compression coefficient $R_A$. The compression rate of the JPEG compression for the objects belonging to the group A is increased each time the reduction and compression process for all the objects in the group A makes one round.

The processes S540-S550 are the same as the processes S230-S240 (FIG. 3) of the background region compression process according to the first embodiment, and descriptions thereof will be omitted. Note, the process S550 is performed by using the compression table generated in S535.

In S555, for the objects on which the reduction and compression process A has been performed, the CPU 11 identifies data sizes of each resultant object. Further, for other objects on which the reduction and compression process A has not been performed, the CPU 11 identifies data sizes of each original object. Similarly to the process S450 of the third embodiment, the CPU 11 identifies the data size of the resultant object of the respective latest reduction and compression process A. Then, the CPU 11 calculates a total sum of the identified data sizes and determines whether or not the total sum is larger than the target data size of the background region set in S520. When an affirmative determination is made (S555: YES), the CPU 11 shifts to S560.

When a negative determination is made (S555: NO), the CPU 11 ends the background region compression process.

When ending the background region compression process, the CPU 11 stores the background region by storing all the objects in a PDF format. Specifically, for the objects on which the reduction and compression process A has been performed, each resultant object by the respective latest reduction and compression process A is stored in the PDF format. For the objects on which the reduction and compression process A has not been performed, each object itself is stored in the PDF without change (without reduction in size and without compression). As a modification, in S555, for the objects on which the reduction and compression process A with the latest number I has not been performed, the CPU 11 selects data size of each original object for the objects. In this case, when ending the background region process, for the objects on which the reduction and compression process A with the latest number I, the CPU 11 stores each resultant object, and for the objects on which the reduction and compression process A with latest number I has not been performed, the CPU 11 stores each original object. As another modification, in S555, for the objects on which the reduction and compression process B with previous number I−1 is performed, the CPU 11 may identify the data size of the compressed object by the reduction and compression process B with the previous number I−1. In this case, when ending the background region compression process, for the objects on which the reduction and compression process B with previous number I−1 is performed, the CPU 11 stores the data size of the compressed object by the reduction and compression process B with the previous number I−1 in the PDF format.

In S560, the CPU 11 determines whether or not the processes S535-S550 are completed for all the objects in the group A. When an affirmative determination is made (S560: YES), the CPU 11 selects a first object in the group B according to the process order determined in S515 and then shifts to S565. When a negative determination is made (S560: NO), the CPU 11 selects a next object to be processed in the group A according to the process order determined in S515 and then shifts to S535.

Similarly to S535, in S565 the CPU 11 generates the compression table (DCT(i,j)) according to the equation (8) and then shifts to S570. In this case, the compression coefficient $R_B$ for the group B is substituted into the compression coefficient R of the equation (8).

The compression table is generated using the compression coefficient $R_B$ as described above. The compression rate of the JPEG compression for the objects belonging to the group B is increased each time the reduction and compression process (S570-S575) for all the objects in the group B makes one round.

In S570, the CPU 11 reduces the currently selected object at a prescribed reduction ratio (the scale) and then shifts to S575.

The process S575 is basically the same as process S550 (FIG. 8), but the JPEG compression is performed by using the compression table generated in S565.

In S580, for the objects belonging to the group A on which the reduction and compression process A has been performed, the CPU 11 identifies data sizes of each resultant object. Further, for the objects on which the reduction and compression process B has been performed, the CPU 11 identifies the data sizes of each resultant object. For the object on which neither the reduction and compression process A nor B has been performed, the CPU 11 identifies the data sizes of each original object. Similarly to the process S555, the CPU 11 identifies the data size of the resultant object of the respective latest reduction and compression process A or B. Then, the CPU 11 calculates a total sum of the identified data sizes and determines whether or not the total sum is larger than the target data size of the background region set in S520. When an affirmative determination is made (S580: YES), the CPU 11 shifts to S585. When a negative determination is made (S580: NO), the CPU 11 ends the background region compression process.

When ending the background region compression process, the CPU 11 stores the background region by storing all the objects in a PDF format. Specifically, for the objects on which the reduction and compression process A or B has been performed, each resultant object (respective latest compressed object) is stored in the PDF format. For the objects on which nether the reduction and compression process A nor B has been performed, each object itself is stored in the PDF without change (without reduction in size and without compression). In S580, for the objects on which the reduction and compression process B with the latest number I has not been performed, the CPU 11 selects data size of each original object for the objects. In this case, when ending the background region process, for the objects on which the reduction and compression process B with the latest number I, the CPU 11 stores each resultant object, and for the objects on which the reduction and compression process B with latest number I has not been performed, the CPU 11 stores each original object.

In S585, the CPU 11 determines whether or not processes S565-S575 are completed for all the objects belonging to the group B. When an affirmative determination is made (S585: YES), the CPU 11 shifts to S530. In this case, the CPU 11 selects a first object in the group A according to the process order and increments the number I. In other words, the affirmative determination in S585 indicates that the reduction and compression process for all the objects makes one round. When shifting to S530, the CPU 11 calculate the compression coefficients $R_A$ and $R_B$ based on the incremented number I. On the other hand, when a negative determination is made (S585: NO), the CPU 11 selects a next object in the group B according to the process order determined in S515 and then shifts to S565.

As described above, in the background region compression process according to the fourth embodiment, the compression coefficients $R_A$ and $R_B$ for the objects belonging to the respective groups A and B are increased each time the reduction and compression process for the objects makes one round. Thus, each time the reduction and compression process makes one round, the JPEG compression is performed on the objects at a higher compression rate. Further, the JPEG compression is performed using the compression coefficient ($R_A$, $R_B$) depending on the groups A and B.

[Advantages]

According to the multifunction peripheral 10 according to the first to fourth embodiments, a JPEG compression and a reduction of size are performed for each object included in the background region of the input image using a weight or a reduction ratio (scale) according to the amount of characteristic of the object, thereby suppressing degradation of the object image.

Further, a JPEG compression and a reduction in size are performed for each object depending on the target value of the data size of the entire background region, thereby preventing excessive JPEG compression to be applied to each object.

Thus, a data size of the background region can be reduced while reliably suppressing degradation of the background image.

[Modifications]

While the invention has been described in detail with reference to the embodiments thereof, it would be apparent to those skilled in the art that various changes and modifications may be made therein without departing from the scope of the invention.

(1) In the background compression processes of the first to fourth embodiments, the reduction and compression process including both the JPEG compression and the reduction in size are performed on each object depending on the amount of characteristic of the object, thereby reducing the data size.

However, the reduction and compression process is not limited to this. For example, only one of the JPEG compression and the reduction in the size may be performed on each object in order to reduce the data size. Even in this case, the advantages the same as the above embodiments can be achieved.

(2) In the background region compression process of the third and fourth embodiments, the JPEG compression is performed using the compression table which is generated using the compression coefficient, whereby the compression rate of the JPEG compression is increased each time the JPEG compression and the reduction in size for all the objects (or objects belonging to the groups A and B) make one round.

However, the background region compression process of the third and fourth embodiments is not limited to this, but a configuration may be adopted in which a reduction ratio (Scale) of the object is calculated using the compression coefficient, and the reduction ratio (scale) increases each time the JPEG compression and the reduction in size for all the objects (or objects belonging to the groups A and B) make one round. Even in this case, the advantages the same as the third and fourth embodiment can be achieved.

(3) Further, in the first to fourth embodiments, the present invention is applied to the high-compression PDF in which input image data is separated into character image data and background image data and the character data and the background image data are individually compressed. However, the present invention may be applied to image data other than this high-compression PDF.

Specifically, the same processes as the background region compression process may be performed not for the background region obtained by removing the character region from the input image but for the input image including both the background and character region. In this case, the input image may be separated into a plurality of objects, and the JPEG compression and the reduction in size are performed on each object. Accordingly, an image file of a prescribed format is generated. In this case, the processes S105, S110, S120, and S125 (FIG. 2) are omitted. Even in this case, the advantages the same as the embodiments can be achieved.

(4) Further, in the background region compression processes of the third and fourth embodiments, a different compression coefficient may be used for each object. In this case, when the reduction and compression process is executed for the first time (when the processes S430-S445 are executed for the first time in the background region compression process of the third embodiment, or when the processes S535-S550 or the processes S565-S575 are executed for the first time in the background region compression process of the fourth embodiment) for at least some objects (e.g., objects each having a comparatively large amount of characteristic), the compression coefficient may be set to 0. When the compression coefficient is set to 0, the JPEG compression is not performed on the object.

Thus, in a case where the data size is not sufficiently reduced even when the reduction and compression process is performed for objects which are unlikely to be degraded by reduction and compression process, the reduction and compression process is performed for objects which are likely to be degraded by the reduction and compression process. Thus, the data size can be reliably reduced while suppressing degradation of the image.

(5) The reduction and compression process, that is, a process for reducing the data size of the objects, may not be performed on some object. For example, the CPU 11 skips the reduction and compression process for objects having an amount of characteristic larger than a prescribed value.

A correspondence relation between the terms used in the embodiments and the terms used in claims of the invention will be described.

The process S100 in the high-compression PDF generation process of the first to fourth embodiments corresponds to an example of an acquiring process.

Further, the process S205 in the background region compression process of the first embodiment corresponds to an example of a calculating process, the process S215 corresponds to an example of a setting process, and the process S225-S245 correspond to an example of a reducing process.

Further, process of S305 in the background region compression process of the second embodiment corresponds to an example of a calculating process, the process S310 corresponds to an example of a classifying process, the process S320 corresponds to an example of a setting process, and the processes S330-S375 correspond to an example of a reducing process.

Further, the process S405 in the background region compression process of the third embodiment corresponds to an example of a calculating process, the process S415 corresponds to an example of a setting process, and the processes S425-S445 correspond to an example of a reducing process.

Further, the process S505 in the background region compression process of the fourth embodiment corresponds to an example of a calculating process, the process S510 corresponds to an example of a classifying process, the process S520 corresponds to an example of a setting process, and the processes S530-S575 correspond to an example of a reducing process.

Further, a timing at which the processes S330-S345 are executed for the object belonging to the group A in the background region compression process of the second embodiment corresponds to an example of a first timing, and a timing at which the processes S360-S370 are executed for the object belonging to the group B corresponds to an example of a second timing.

Further, a timing at which the processes S430-S445 are executed for the first time for each object in the background region compression process of the third embodiment corresponds to an example of the first timing, and a timing at which the processes S430-S445 are executed for the second time corresponds to an example of the second timing.

Further, a timing at which the processes S535-S550 and S565-S575 are executed for the first time for each object in the background region compression process of the fourth embodiment corresponds to an example of the first timing, and a timing at which the processes S535-S550 and S565-S575 are executed for the second time corresponds to an example of the second timing.

What is claimed is:

1. An image processing device comprising a controller configured to perform:
acquiring image data representing an image and having a plurality of objects, each of the plurality of objects defining an object region in the image, each of the plurality of objects having pixels, the plurality of objects having a first object and a second object;
calculating an amount of characteristic of each of the plurality of objects, the amount of characteristic indicating a degree of change in pixel values corresponding to the pixels in the object;
setting a process order based on the amount of the characteristic of each of the plurality of objects, the first object corresponding to a first order in the process order and the second object corresponding to a second order in the process order;
setting a target value with respect to the image data, the target value being a reference value to reduce a data size of the image data;
reducing an object data size of the first object based on the target value and an amount of characteristic of the first object, thereby generating a first reduced object; and
generating first reduced image data by using the first reduced object and the second object when a data size of the first reduced image data is estimated to be smaller than or equal to the target value,
wherein when the data size of the first reduced image data is estimated to be larger than the target value, the controller is further configured to perform:
reducing an object data size of the second object based on the target value and an amount of characteristic of the second object, thereby generating a second reduced object; and
generating second reduced image data by using the first reduced object and the second reduced object.

2. The image processing device according to claim 1, wherein the larger the amount of characteristic the object has, the higher the degree of change in the pixel value is,
wherein the amount of characteristic of the second object is larger than the amount of characteristic of the first object.

3. The image processing device according to claim 1, wherein the smaller the amount of characteristic the object has, the smaller object data size the controller reduces the object data size of the object to.

4. The image processing device according to claim 1, wherein the amount of characteristic of each of the plurality of objects indicates a degree of deviation from an average of pixel values in the object.

5. An image processing device comprising a controller configured to perform:
acquiring image data representing an image and having a plurality of objects, each of the plurality of objects defining an object region in the image, each of the plurality of objects having pixels;
calculating an amount of characteristic of each of the plurality of objects, the amount of characteristic indicating a degree of change in pixel values corresponding to the pixels in the object;
setting a target value with respect to the image data, the target value being a reference value to reduce a data size of the image data;
setting at least one target object from among the plurality of objects;
reducing an object data size of each of the at least one target object based on an amount of characteristic corresponding to the each of the at least one target object, thereby generating at least one reduced object;
generating first reduced image data by using the at least one reduced object and remaining object other than the at least one target object when a data size of the first reduced image data is estimated to be smaller than or equal to the target value; and
generating second reduced image data by reducing the at least one target object at a constant reduction ratio when a data size of the first reduced image data is estimated to be larger than the target value.

6. A non-transitory computer readable storage medium storing a set of program instructions installed on and executed by a computer, the program instructions comprising:
acquiring image data representing an image and having a plurality of objects, each of the plurality of objects defining an object region in the image, each of the plurality of objects having pixels, the plurality of objects having a first object and a second object;
calculating an amount of characteristic of each of the plurality of objects, the amount of characteristic indicating a degree of change in pixel values corresponding to the pixels in the object;
setting a process order based on the amount of the characteristic of each of the plurality of objects, the first object corresponding to a first order in the process order and the second object corresponding to a second order in the process order;
setting a target value with respect to the image data, the target value being a reference value to reduce a data size of the image data;
reducing an object data size of the first object based on the target value and an amount of characteristic of the first object, thereby generating a first reduced object; and
generating first reduced image data by using the first reduced object and the second object when a data size of the first reduced image data is estimated to be smaller than or equal to the target value,
wherein when the data size of the first reduced image data is estimated to be larger than the target value, the controller is further configured to perform:
reducing an object data size of the second object based on the target value and an amount of characteristic of the second object, thereby generating a second reduced object; and
generating second reduced image data by using the first reduced object and the second reduced object.

7. A non-transitory computer readable storage medium storing a set of program instructions installed on and executed by a computer, the program instructions comprising:
acquiring image data representing an image and having a plurality of objects, each of the plurality of objects defining an object region in the image, each of the plurality of objects having pixels;
calculating an amount of characteristic of each of the plurality of objects, the amount of characteristic indicating a degree of change in pixel values corresponding to the pixels in the object;
setting a target value with respect to the image data, the target value being a reference value to reduce a data size of the image data;
setting at least one target object from among the plurality of objects;
reducing an object data size of each of the at least one target object based on an amount of characteristic corresponding to the each of the at least one target object, thereby generating at least one reduced object;

generating first reduced image data by using the at least one reduced object and remaining object other than the at least one target object when a data size of the first reduced image data is estimated to be smaller than or equal to the target value; and generating second reduced image data by reducing the at least one target object at a constant reduction ratio when a data size of the first reduced image data is estimated to be larger than the target value.

\* \* \* \* \*